(12) United States Patent
Johnson

(10) Patent No.: US 7,942,536 B1
(45) Date of Patent: May 17, 2011

(54) PANORAMIC COSMETIC MIRROR PROVIDING MULTIPLE PERSPECTIVES

(76) Inventor: Trulah Roeseler Johnson, Conroe, TX (US)

( * ) Notice: Subject to any disclaimer, the term of this patent is extended or adjusted under 35 U.S.C. 154(b) by 0 days.

(21) Appl. No.: 12/660,299

(22) Filed: Feb. 24, 2010

(51) Int. Cl.
*G02B 5/08* (2006.01)
(52) U.S. Cl. ........................................ 359/854
(58) Field of Classification Search .................. 359/850, 359/854, 855, 856, 857, 860, 861
See application file for complete search history.

(56) References Cited

U.S. PATENT DOCUMENTS 5,359,460 A * 10/1994 Urakawa ........................ 359/855
7,418,925 B2 * 9/2008 Rutherford ..................... 359/850
* cited by examiner

*Primary Examiner* — Euncha P Cherry

(57) ABSTRACT

A panoramic cosmetic mirror assembly providing multiple images of an individual's face from a variety of angles. This mirror assembly is an assembly of at least five flat mirrors including a central quadrangular flat plane mirror and four additional flat plane side mirrors attached to each side of the central mirror. The plane of each side mirror is beveled forward relative to that of the central mirror to allow each mirror to reflect the images in the other four mirrors. Additional features include the use of magnifying mirrors, electrical illumination and ventilation, and an adjustable stand.

16 Claims, 6 Drawing Sheets

PANORAMIC COSMETIC MIRROR PROVIDING MULTIPLE PERSPECTIVES

BACKGROUND OF THE INVENTION

1. Field of the Invention

The present invention relates generally to the fields of mirrors and optics. More specifically, the present invention relates to a panoramic cosmetic mirror offering improved views of an individual's face and head during personal grooming and hygiene activities.

2. Description of the Related Art

Mirrors are commonly used in the performance of personal grooming activities such as shaving, cosmetic application, hair styling and skin care among others. While mirrors are indispensible in the performance of such activities, inherent limitations in conventional mirrors result in images that are only an approximation of an individual's appearance, thereby hindering the ability of individuals to self-groom and accurately view the results of grooming performed by others.

An individual flat mirrors is limited in that it can only provide a two dimensional image of personal features that are in fact three dimensional. Thus, while the resulting images are accurate for the flatter portions of an individual's anatomy, the images of features that slope away to the side, top and bottom of an individual head are considerably distorted. While the obvious solution is to move the mirror to better view these features, human eyes are limited in their motion range and peripheral vision. This results in great difficulties in accurately viewing these features as well as eye strain and fatigue from prolonged viewing at angles that are difficult for the human eye to maintain.

Some of these difficulties have been overcome in the past by the use of three way mirrors consisting of a central mirrors flanked by side mirrors placed at various acute angles, allowing the sides of an individual to be viewed. While an improvement over standard flat mirrors the number and angles can be at any given time remains limited. To switch from viewing the sides of the head to viewing the top and bottom still requires that the mirror assembly be rotated, often requiring that one hand be used to stabilize the mirror and thus making grooming functions difficult. Attempts to solve this problem have included the use of concave curved mirrors but such mirrors introduce considerable distortions in shape and dimension the further out the image is viewed from the center.

Lighting provides additional difficulties in the manipulations of mirrors. As mirrors and mirror assemblies are rotated to change the angles are which images are viewed, differences in the position of the mirror change the mount of ambient lighting that is reflected in the image. As a result, the image may be too bright or dark for effective grooming. In additional, bright lighting is often necessary for the accurate performance of grooming functions. The heat produced by the lighting combined with the blockage of the air flow caused by the mirror itself can cause excessive perspiration which may interfere with grooming functions such as cosmetic application.

Numerous attempts to improve on cosmetic mirrors are known in the previous art:

U.S. Pat. No. 2,266,089 (Shipman) uses an assembly of multiple mirrors in stage device that provides a kaleidoscopic multiplication of images to provide optical illusions in theatrical performances. This is achieved by positioning and rotating a series of mirrors around a central axis.

U.S. Pat. No. 4,720,184 (Watson) teaches a device allowing an individual to view two images of said individual, either side by side or separately. One image is a standard reversed mirror image and the other is a corrected true image as might be seen by others looking directly upon the individual. The device uses to angularly positioned mirrors that a viewed through a mirror housing.

U.S. Pat. No. 5,090,300 (Berenstein) provides a portable mirror unit consisting of a single framed flat mirror and a fan unit to blow low velocity air against the face of a user. The air flow is intended to be "pleasurable" to the user during shaving or makeup application.

A portable cosmetic mirror including a stand is described in U.S. Pat. No. 5,359,461 (Rice et al.). The stand allows a single flat mirror to be adjusted to a height convenient for the user so that both hands may be free for cosmetic operations. A magnifying means may be removable positioned on the flat mirror.

U.S. Pat. Disclosure DES 416,691 provides a portable lighted single flat mirror positioned on an adjustable stand.

U.S. Pat. No. 6,347,876 B1 (Burton) describes a three way mirror mounted on an adjustable telescoping stand. The side mirrors are adjustable in angle and the assembly includes a lighting source positioned above the central mirror.

A portable mirror system is disclosed in U.S. Pat. No. 6,382,802 B1 (Goodman) consisting of a round, two-sided mirror mounted on an adjustable tripod stand. The two-sided mirror is rotatable with triple power magnification on one side and one magnification power on the other.

U.S. Pat. No. 7,090,378 B1 (Zadro) provides a dual mirror assemble attached to a handle that is pivotably and telescopically extendable. The dual mirror assembly consists of two circular mirrors of different magnification powers, each surrounded by a ring-shaped lamp and overlain with a diffuser ring.

A portable, foldable mirror is disclosed in U.S. Pat. No. 7,347,573 (Isler). The foldable mirror comprises a foldable three way mirror with an additional base panel at the bottom and a light source at the top of the foldable three way mirror. The mirror assembly is intended to facilitate foot examination in persons prone to foot problems.

The prior art is deficient in the lack of a mirror assembly capable of simultaneously providing a plurality of panoramic views, including front, side, top, bottom and other angles) of an individual or face thereof. The present invention addressed this lack.

SUMMARY OF THE INVENTION

The instant invention provides a panoramic cosmetic mirror assembly capable of providing multiple images of an individual's face from a variety of angles. This mirror assembly said mirror comprising an assembly of at least five mirrors including a central quadrangular flat plane mirror and four additional flat plane side mirrors. Each side mirror has at least one linear edge, which is attached to one of the linear edges of the central mirror with the plane of each side mirror beveled forward at an acute angle from the plane of the central mirror. This angle may be angle between 0 and 90 degrees. In one embodiment of the present invention, this angle was a 45 degree angle.

The present invention also provides an assembly in which a magnifying mirror is attached to the face of said central mirror. The magnifying mirror may provide magnification power ranging from 2× to 10× magnification. The magnifying mirror may be attached by a removable attachment means such as suction cups, clips, or magnets. Removable attachment may allow magnification mirrors of different magnification powers to be interchanged on the lace of the central mirror.

The panoramic cosmetic mirror assembly may also include lighting and ventilations means such as a variable speed ventilation fan with an air outlet adjacent to said assembly. It may prove desirable to pivotably attach the mirror assembly to a telescopic, height adjustable pole connected to a supportive base.

The instant invention also teaches a panoramic cosmetic mirror assembly comprising a concave opening shaped as a rectilinear frustum. This concave sides of this frustum comprise: i) a small quadrangular flat plane central mirror positioned distally to an observer; ii) four trapezoidal-shaped flat plane side mirrors attached to each side of the central mirror and beveled forward relative to the plane thereof, thus forming and angled sides of the frustum, and iii) a larger open quadrangle proximal to an observer. Attachment means are provided for interchangeably attaching magnifying mirrors to the flat planar surface of the central. The mirror assembly also includes lighting means; a variable speed fan with an outlet adjacent to said mirror case; a supportive base; and, a telescopic pole pivotably attached between said mirror case and supportive base. Each side mirror may be beveled forward at a 45 degree angle.

The magnifying mirrors may range in magnification between 2× and 10×. Possible removable attachment means for the magnifying mirrors include suction cups, clips, and magnets.

Lighting means may include incandescent light bulbs, fluorescent lights, and LED lights. In a specific embodiment, the lights are positioned in the interstices between each said side mirror. The lighting may be controlled via a dimmer switch.

In another embodiment of the present invention, the telescopic pole may be pivotably attached to the base and mirror case to allow for variable angular positioning thereof.

BRIEF DESCRIPTION OF THE DRAWINGS

So that the matter in which the above recited features, advantages and objects of the invention, as well as others which will become clear, are attained and can be understood in detail, more particular descriptions of, the invention briefly summarized above may be had by reference to certain embodiments thereof which are illustrated in the appended drawings. These drawings form a part of the specification. It is to be noted, however, that the appended drawings illustrate preferred embodiments of the invention and therefore are not to be considered limiting in their scope.

FIG. 1 shows a frontal view of one embodiment of the panoramic cosmetic mirror assembly described herein. A quadrangular central mirror (1.) directly faces an observer. The short parallel side of each trapezoidal-shaped, beveled side mirror (2.) Is attached to one edge of the central mirror with the plane of each side mirror beveled forward at an acute angle relative to the plane of the central mirror (1.). Each beveled side mirror (2.) Is attached to two neighboring beveled side mirrors along its angled sides. The longer parallel sides or each side mirror define a quadrangular shape with its plane positioned forward and parallel to that of the central mirror. This forward quadrangular plane is left open to allow an observer to view the images produced by the mirrors. The concave space provided thereby may be defined as a quadrangular frustum. Light bulbs (4.) Have been inserted along each interstice between to neighboring side mirrors to provide illumination. The outlet of the fan vent (7.) is present on top of the assembly of mirrors to direct airflow toward the observer. A light switch (8.) and fan switch (9.) are provided on the side of the mirror assembly.

FIG. 2 shows the mirror assembly of FIG. 1 with a magnifying mirror (3.) attached to the face of the central mirror (1.), in this case. Other visible parts include the beveled side mirrors (2.); light bulbs (4.); fan vent outlet (7.); light switch (8.); and, fan switch (9).

FIG. 3 shows a front angled perspective view of the mirror assembly in which the frustum shape defined by the central mirror (1.) and beveled side mirrors (2.) can be observed. In this illustration, a magnifying mirror (3.) has been attached to the face of the central mirror (1.). Also visible in this view are the positions of the casing of the fan (5.) and the fan vent (7.). The position of the fan air intake (6) is noted but is not visible as it is positioned away from the viewer. Other visible parts include the light bulbs (4.); light switch (8.); and, fan switch (9.).

FIG. 4 shows a view of the backside of the mirror assembly in which the fan air intake (6.) can be seen. Also, more readily visible is the power cord (10). The top of a telescopic pole is visible below the fan air intake. Other visible parts include the light switch (8.) and fan switch (9.).

FIG. 5 shows another side view of the mirror assembly in which the positions of the fan (5.); fan air intake (6.); and, fan vent outlet (7.) are visible. A small stem under the fan projects backward and is attached to the top of a supporting pole.

DETAILED DESCRIPTION OF THE INVENTION

Figure 1:
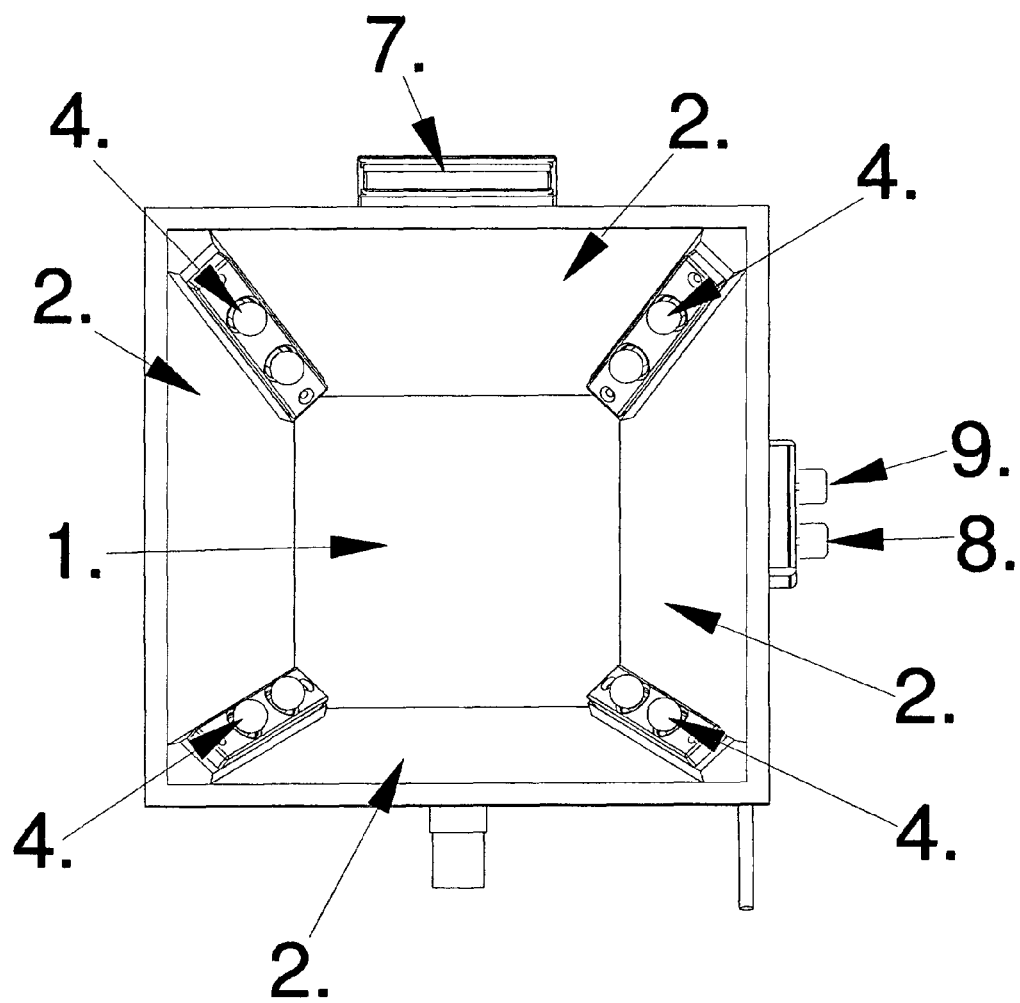
FIGS. 1 through 5 illustrate the design of a prototype of the instant invention. The component parts are number consistently throughout these figures and comprise: 1. central mirror; 2. beveled side mirror; 3. magnifying mirror; 4. light bulb; 5. fan; 6. fan air intake; 7. fan vent outlet; 8. light switch; 9. fan switch; 10. Power cord; 11. Telescopic pole; and, 12. supportive base.

Therefore, if appearing herein, the following terms shall have the definitions set out below.

A mirror, as used herein, comprises any reflective surface capable of reflecting light back to produce an image of any object facing said surface. Mirrors may comprise a transparent substrate backed with a reflective coating or highly polished mirror. Possible transparent substrates include silica or quartz glass and clear plastics such as plexiglas [Poly(methyl methacrylate) (PMMA) or poly(methyl 2-methylpropenoate)]. The reflective coating may be a metallic coating such as silver, chrome, or aluminum. Alternatively, the reflective surface may be a highly polished metallic layer such as chrome or stainless steel.

A lighting source, as used herein, comprises any means of providing additional light for viewing beyond that provided by ambient light conditions. Preferably, this light source will be from electrical lamps. Electrical lamps may include incandescent light bulb, LED lights, or fluorescent lamps, among other possibilities.

A fan, as used herein, comprises any mechanical means of propelling airflow. A fan typically consists of a series of blade or vanes arranged around a central axis, which is then rotated by an electrical motor. However, other types of fan such centrifugal fans and crossflow fans could conceivably be used. In the examples provided herein, a standard computer fan has been used.

The mirror assembly provided herein may comprise a set of mirrors arranged around an open space that may be described as a frustum. A frustum is the portion of a geometrical solid, (such as a pyramid) which is cutoff between two parallel planes. This results in a shape that may also be described as a truncated pyramid, The panoramic cosmetic mirror assembly described and claimed herein is capable of providing multiple images of an individual's face from a variety of angles to facilitate personal grooming and cosmetic applications. This is accomplished with an assembly of at least five mirrors including a central quadrangular flat mirrors and four additional flat plane side mirrors with one side mirror attached to each side of the central mirror In one embodiment of the instant invention, the side mirrors may be of any shape as long as there is at least one linear edge to attach to the central mirror. Each side mirror is positioned so that the plane of the side. The exact angle used will depend on the size of the mirror and desired position from which an observer will use the mirror. The mirror assembly tends to be most useful when thus the side mirrors are beveled forward at angles between 20 and 70 degrees. This could be alternatively described as the plane of the central mirror and the plane of each side forming an angle ranging from 110 to 160 degrees. In the prototype described herein, the side mirrors were beveled forward at 45 degree angles, resulting in 135 degree angles between the plane of the central mirror and the plane each side mirror.

In the specific embodiment taught in the example provided herein, the panoramic cosmetic mirror assembly is designed with mirrors forming concave opening shaped as a rectilinear frustum. This concave sides of this frustum comprise: i) a small quadrangular flat plane central mirror positioned distally to an observer; ii) four trapezoidal-shaped flat plane side mirrors attached to each side of the central mirror and beveled forward relative to the plane thereof, thus forming and angled sides of the frustum, and iii) a larger open quadrangle proximal to an observer. This arrangement, by allowing the side mirrors to be attached to each other as well as the central mirror, provides additional strength and stability to the mirror assembly Using the mirror assemblies taught by the instant invention, an individual standing in an appropriate position will be able to view multiple images said individual's face from a variety of angles. Each mirror will reflect the image of the other four mirrors. Thus, it is possible to view a minimum of twenty images of said individual. Since the images are being reflected from mirrors placed above, below and to the sides of said individual, it is easy to view any portion of the face from any desired position or perspective.

A further feature of the instant invention is the ability to place a round magnifying mirror on the face of said central mirror to allow for more detailed viewing and cosmetic manipulation of specific features on an individual's face. The magnifying mirror may provide magnification power ranging from 2× to 10× magnification. While the magnifying mirror may be permanently attached, it is especially useful for magnifying mirror to be attached by a removable attachment means to allow an individual to choose between using the magnifying mirror and the central flat mirror. Removable attachment may also allow magnification mirrors of different magnification powers to be interchanged on the face of the central mirror. Possible removable attachment means include suction cups, clips, or magnets.

The panoramic cosmetic mirror assembly may also include lighting means. Lighting means may include incandescent light bulbs, fluorescent lights, and LED lights. In a specific embodiment described herein, incandescent light bulbs are used with the bulbs placed in pairs along the interstices between the side mirrors. An alternative arrangement would be to place the lights along the outside edges of the central mirror. It may also be useful to provide projecting supports on the frame of the mirror assembly to allow the lights to be placed some distance from the mirror frame. Such an arrangement may also allow the lights to be variably positioned. The lighting may be controlled by either a simple on/off switch or a dimmer switch.

It is also desirable that ventilations means be provided to allow for cooling and moisture/condensation control during the use of the mirror assembly. The simplest way to provides this is by means of a fan directing airflow through vents directing airflow through the mirror assembly toward the individual using the mirror. These vents may be placed among the mirrors or to one side of them. In the example provided herein, a fan assembly is place behind the mirror assembly. Air is drawn by a fan through an intake opening on the backside of the mirrors and directed through a vent to an air outlet projecting above the mirror assembly. The fan may be controlled by either a simple or variable speed fan. A number of small fans are readily available that can be used for this purpose. Standard issue personal computer cooling fans, such as those placed in the openings in the cases of central processing units (CPU) are readily are readily available and of a desirable strength.

The mirror assembly of the instant invention may be designed to mounted, free standing, or a stand can be provided, When a stand is provided, it especially useful to provide a means to adjust the height or the mirror assembly relative to the individual using it. One way to achieve this end is through the use of a telescopic pole attaching the mirror assembly to a supportive base. Telescopic poles are used in numerous consumer products and are thus readily available and/or designed. It may be useful to also provide adjustable pivots on one or both ends of the telescopic pole to allow the mirror assembly and base to be rotatably adjusted and positioned.

The following examples are embodiments of the invention and are not meant to limit the present invention in any fashion.

EXAMPLE 1

Mirror Prototype

A prototype design for the panoramic cosmetic mirror assembly of the instant invention is shown in FIGS. 1-6. FIG. 1 shows a direct frontal view of the mirror assembly. This prototype was utilized the design in which four trapezoidal side mirrors are attached to the four edges of quadrangular central mirror with the plane of each beveled mirror beveled forward at an acute angle relative to the central mirror. While the planes of these side mirrors may forward at any acute angle, 45 degrees was used in the example illustrated herein, which resulting in a 135 degree angle between the plane of the central mirror and the plane of each side mirror. Each beveled side mirror is also attached to two other side mirrors, one on each angled side of the trapezoidal. The long sides of each trapezoidal side mirror join together to form the sides of an quadrangular plane forward, parallel to and larger than the plane formed by the central mirror. This is left open to the observer to allow for the viewing of the images formed by the optical interactions of the central and side mirrors. The open concave space defined thereby is known as a frustum or truncated pyramid. In the example provided herein, the central mirror and open end was square in shape with the central mirror having diameter of 7 and ½ inches. The frustum shape defined by the central and side mirrors is most readily observable in FIG. 3.

Figure 2:
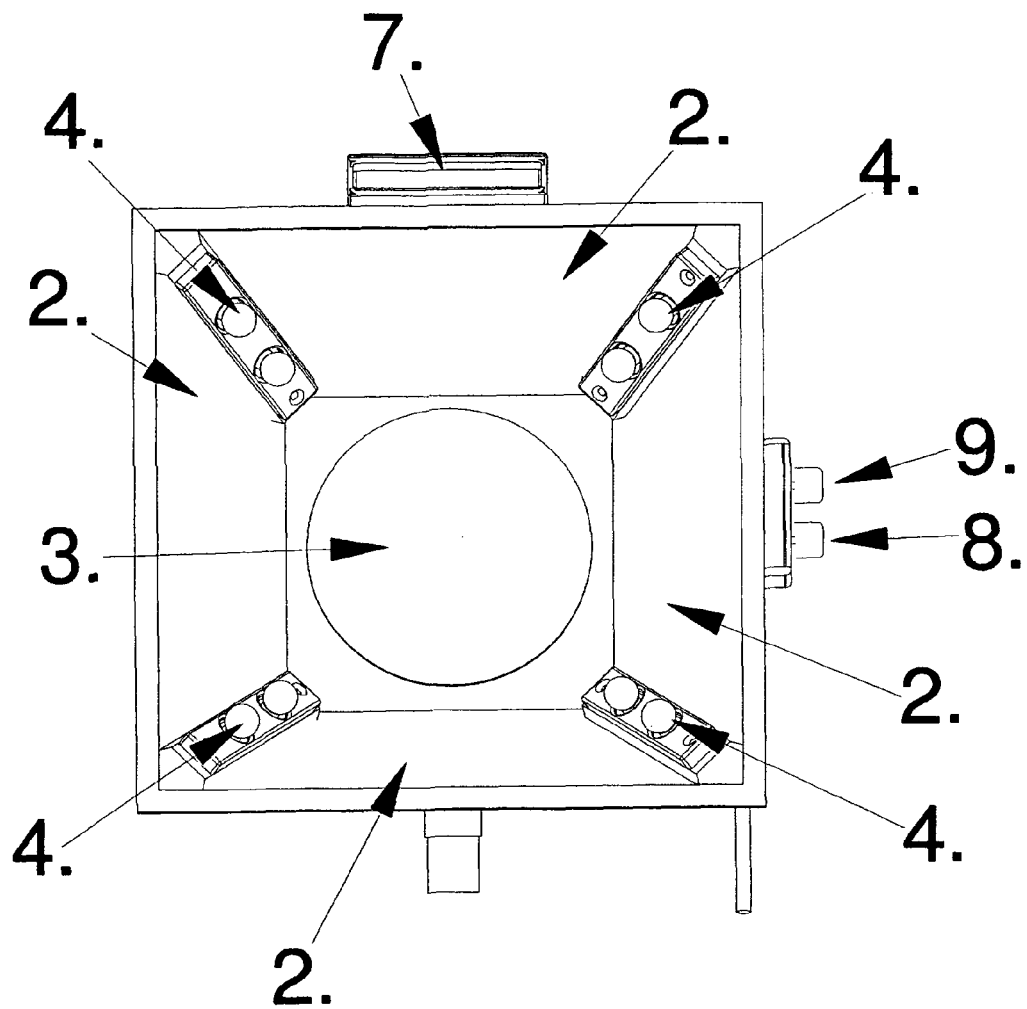
Figure 3:
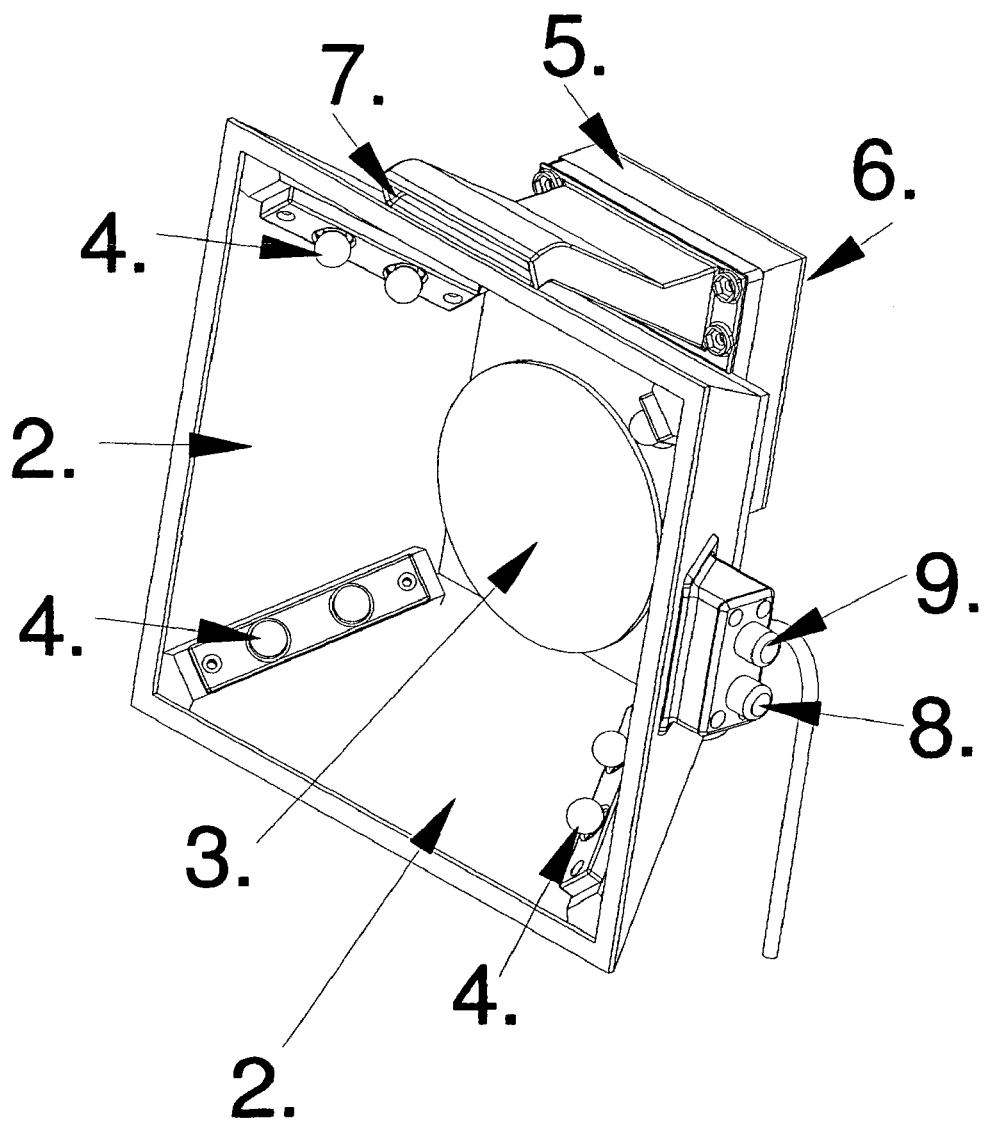
Figure 6:
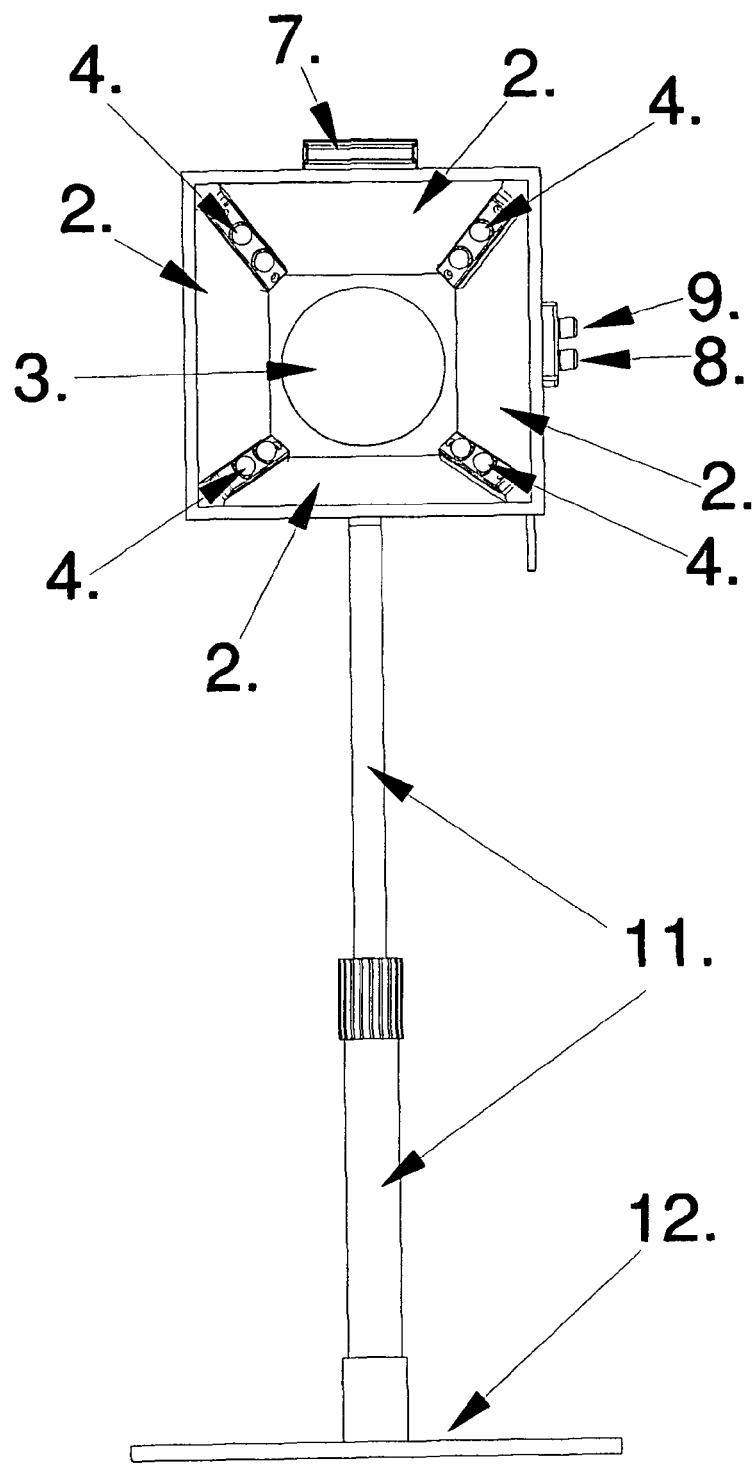
FIG. 6 shows the mirror assembly attached to a telescopic pole (11.) and a supportive base (12.). Other labeled component include the central mirror (1.); beveled side mirrors (2.); magnifying mirror (3.); light bulbs (4.); the outlet of the fan vent (7.); light switch (8.); and, fan switch (9).

In FIGS. 2, 3, and 6, a round magnifying mirror has been attached to the surface of the central mirror by means of suction cups.

Two incandescent light bulbs are present at the interstices of the four beveled side mirrors. These lights are visible in FIGS. 1, 2, 3, and 6. Any flashlight-type incandescent bulb may be used. These lights are controlled by a switch place on the right side of the mirror assembly, as best illustrated in FIG. 3.

Figure 4:
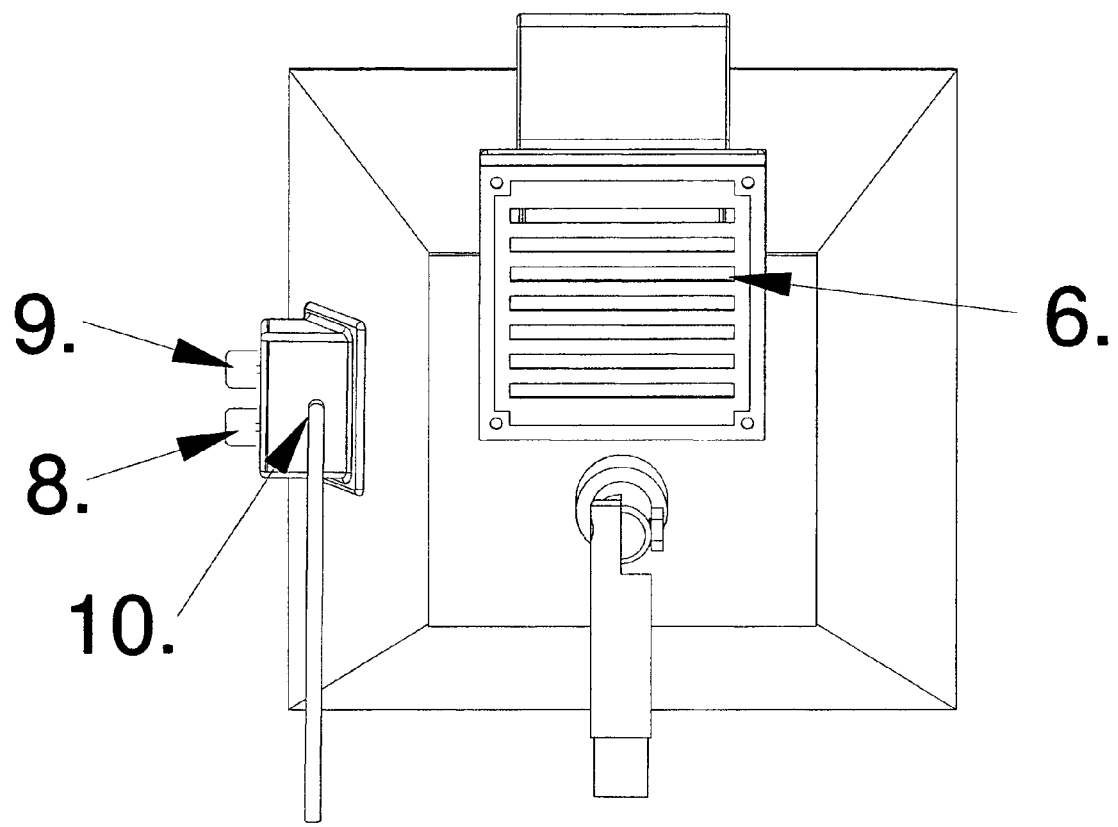
Figure 5:
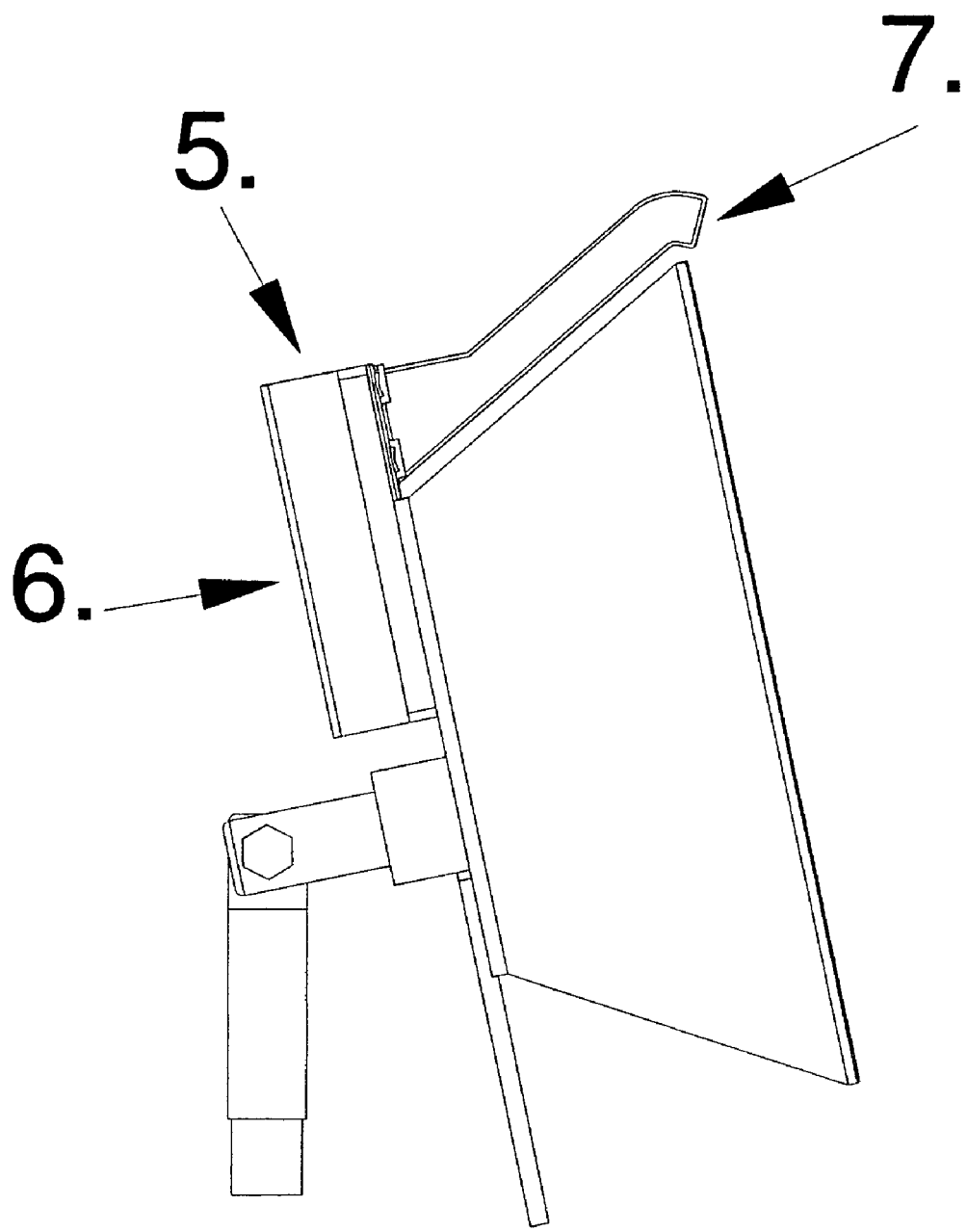

A fan assembly to provide air flow for cooling an observer has been attached behind the mirror assembly with an outflow vent directing air over the top of the mirror assembly toward the viewer (See FIG. 4). A computer fan was used in the construction of the illustrated prototype. The inlet for the fan has been placed on back of the mirror assembly, facing away from the observer. A switch to control the fan has been place above the light switch on the right side of the mirror assembly (See FIG. 3).

A stem on the back of the unit (see FIG. 5) is attached to a telescopic pole, which is itself attached to a supportive base (see FIG. 6). The telescopic pole allows the height of the mirror assembly to be raised or lowered for the convenience of the observer.

The following references were cited herein:

U.S. Pat. No. 2,266,089, Shipman, Mildred Knapp, Stage and Display Device, Dec. 16, 1941.

U.S. Pat. No. 4,720,184, Watson, William, Reversing and Non-Reversing Mirror Device, Jan. 19, 1988.

U.S. Pat. No. 5,090,300, Berenstein, Eugenia, Pleasure Mirror and Fan Unit, Feb. 25, 1992.

U.S. Pat. No. 5,359,461, Rice, Virginia & Galas, May belle I., Portable Cosmetic Mirror Apparatus, Oct. 25, 1994.

U.S. Pat. Des. 416,691, Portable Lighted Mirror, Logan, William Jr., Nov. 23, 1999.

U.S. Pat. No. 6,347,876-B1, Burton, Johnnie, Lighted Mirror Assembly, Feb. 19, 2002.

U.S. Pat. No. 6,382,802-B1, Goodman, Donna M., Portable Floor Mirror, May 7, 2002.

U.S. Pat. No. 7,090,378 B1, Zadro, Zlatko, Dual Magnification Folding Travel Mirror with Annular Illuminator, Aug. 15, 2006.

U.S. Pat. No. 7,347,573 B1, Isler, Glenn E., Portable, Foldable Mirror, Mar. 25, 2008.

Any patents or publications mentioned in this specification are indicative of the levels of those skilled in the art to which the invention pertains. These patents and publications are herein incorporated by reference to the same extent as if each individual publication was specifically and individually indicated to be incorporated by reference.

Changes therein and other uses will occur to those skilled in the art which are encompassed within the spirit of the invention as defined by the scope of the claims.

What is claimed is:

1. A panoramic cosmetic mirror assembly capable of providing multiple images of an individual's face from a variety of angles, said mirror comprising an assembly of a central mirror, four additional side mirrors, lighting means, and a variable speed ventilation fan with an air outlet adjacent to said assembly:

wherein said central mirror comprises a central quadrangular flat plane mirror with four straight linear edges; and, wherein said side mirrors comprise four additional flat plane side mirrors, wherein each side mirror has at least one linear edge, wherein the linear edge of each side mirror is attached to one of the linear edges of the central mirror with the plane of each side mirror beveled forward at an acute angle from the plane of the central mirror.

2. The panoramic cosmetic mirror assembly of claim 1, wherein the plane of each side mirror is beveled forward at a 45 degree angle relative to the plane of the central mirror.

3. The panoramic cosmetic mirror assembly of claim 1, wherein said assembly further comprises a magnifying mirror attached to the plane of said central mirror.

4. The panoramic cosmetic mirror assembly of claim 3, wherein said magnifying mirror provides a magnification power ranging from 2× to 10× magnification.

5. The panoramic cosmetic mirror assembly of claim 3, wherein said magnifying mirror is attached to said central mirror by a removable attachment means.

6. The panoramic cosmetic mirror assembly of claim 5, wherein said removable attachment means is selected from the group comprising suction cups, clips, and magnets.

7. The panoramic cosmetic mirror assembly of claim 5, wherein said removable attachment means allows magnification mirrors of different magnification powers to be interchanged on said assembly.

8. The panoramic cosmetic mirror assembly of claim 1, further comprising telescopic pole pivotably attaching said mirror assembly to a supportive base.

9. The panoramic cosmetic mirror of claim 1, wherein said telescopic pole is pivotally attached to said base and said mirror case to allow for variable angular positioning thereof.

10. A panoramic cosmetic mirror assembly capable of providing multiple images of an individual's face from a variety of angles, said mirror comprising:

a) a mirror case comprising a concave opening shaped as a rectilinear frustum, wherein said frustum consists of:

i) a small quadrangular flat plane central mirror positioned distally to an observer;

ii) four trapezoidal-shaped flat plane side mirrors attached to each side of the central mirror, wherein each side mirror is shaped to have long and short parallel side connected by sides angled outward from the short parallel side, wherein each side mirror is attached to the central mirror via the short parallel side with the plane of the side mirror beveled forward relative to the plane of the central mirror and each angled side is connected to an angled side of a neighboring side mirror, and wherein the long parallel sides are connected to form the edges of a larger quadrangle proximal to an observer, wherein said quadrangle is open to allow said viewer to look into the frustum and mirrors attached thereto;

c) an attachment means for interchangeably attaching magnifying mirrors to the flat planar surface of said central mirror;

d) one or more magnifying mirrors to be attached via said attachment means;

e) lighting means;

f) a variable speed fan with an outlet adjacent to said mirror case g) a supportive base; and, h) a telescopic pole pivotably attached between said mirror case and supportive base.

11. The panoramic cosmetic mirror of claim 10, wherein the forward angle between said back mirror and each side mirror is a 45 degree angle.

12. The panoramic cosmetic mirror of claim 10, wherein said attachment means for a magnifying mirror is selected from the group comprising suction cups, clips, and magnets.

13. The panoramic cosmetic mirror assembly of claim 10, wherein said magnifying mirrors provide a magnification power ranging from 2× to 10× magnification.

14. The panoramic cosmetic mirror of claim 10, wherein said lighting means is selected from the group consisting of incandescent light bulbs, LED lamps, and fluorescent lamps.

15. The panoramic cosmetic mirror of claim 14, wherein said lights are positioned in the interstices between each said side mirror.

16. The panoramic cosmetic mirror of claim 10, wherein said lighting means is controlled via a dimmer switch.

* * * * *